United States Patent
Palermo et al.

(10) Patent No.: US 12,184,630 B1
(45) Date of Patent: Dec. 31, 2024

(54) INSURANCE RECORD REPOSITORY AUTHENTICATION SYSTEM AND METHOD

(71) Applicant: UIPCO, LLC, San Antonio, TX (US)

(72) Inventors: Mitchell Wade Palermo, San Antonio, TX (US); Cynthia Saldana, New Braunfels, TX (US); Ryan Juichi Wakabayashi, Selma, TX (US); Francisco Tomas Garcia, San Antonio, TX (US); Hanna Elizabeth Rafferty, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 383 days.

(21) Appl. No.: 17/657,386

(22) Filed: Mar. 31, 2022

(51) Int. Cl.
  *H04L 9/40* (2022.01)
  *G06F 21/62* (2013.01)
  *G06Q 40/08* (2012.01)

(52) U.S. Cl.
  CPC .............. *H04L 63/08* (2013.01); *G06F 21/62* (2013.01); *G06Q 40/08* (2013.01); *H04L 2463/082* (2013.01)

(58) Field of Classification Search
  None
  See application file for complete search history.

(56) References Cited

U.S. PATENT DOCUMENTS

| | | | | |
|---|---|---|---|---|
| 11,405,189 | B1* | 8/2022 | Bennison | H04L 9/0656 |
| 11,757,625 | B2* | 9/2023 | Vass | H04L 9/0822 |
| | | | | 713/171 |
| 2005/0222924 | A1* | 10/2005 | Sumino | G06Q 40/00 |
| | | | | 705/35 |
| 2011/0238451 | A1* | 9/2011 | Bazzani | G06Q 40/00 |
| | | | | 705/4 |
| 2020/0143481 | A1* | 5/2020 | Brown | G06N 20/20 |
| 2022/0207615 | A1* | 6/2022 | Naqvi | G06Q 40/08 |

\* cited by examiner

*Primary Examiner* — Jeffrey C Pwu
*Assistant Examiner* — Mayasa A. Shaawat
(74) *Attorney, Agent, or Firm* — Plumsea Law Group, LLC

(57) ABSTRACT

A method and system of managing third-party access to insurance information is disclosed. An insurer maintains an insurance information repository that can be accessed only by authenticated third-party partners. The authentication system generates a code for the insured member. The insured member can share the code to their selected third-party service provider. The selected provider will submit the code to the authentication system when requesting access to validated information about the insured member. The code, if valid, will authenticate the service provider and enable access to the requested information.

20 Claims, 12 Drawing Sheets

INSURANCE RECORD REPOSITORY AUTHENTICATION SYSTEM AND METHOD

TECHNICAL FIELD

The present disclosure generally relates to insurance record access management, and specifically to a method and system for authentication of service providers seeking access to individual insurance data in order to process aspects of a claim. The authentication is based on submission of a code and a verification of the provider's location.

BACKGROUND

Third parties can be is interested in verifying information so they can provide accurate estimates or informed and/or tailored products to their prospective customers. Currently, there is no standardized process for insurance companies to allow business partners (e.g., auto-body shops, car dealerships, mortgage lenders) to access and validate insurance policy details for an insured person. This lack of a universal system often results in delays and unproductive communications between the member, business partners, and the insurance company. In many cases it becomes desirable to access to the member's policy information without relying on manual verification of credentials with another representative, or otherwise requiring the business partner to repeatedly request access. It may be appreciated that many businesses and service providers would benefit from mechanisms by which to reduce the costs associated with the validation of insurance data. Furthermore, customers will be attracted by an authentication system that reduces the wait time in processing their insurance claims, as well as a system that significantly improves the security of information stored in their account.

There is a need in the art for a system and method that addresses the shortcomings discussed above.

SUMMARY

In one aspect, a method of managing third-party access to insurance information is disclosed. The method includes a first step of generating, via an authentication computing system for an insurer and in response to a notification from an insured member, a first code. A second step includes receiving, at the authentication computing system and from a first service provider, a first request to access information associated with the insured member, the first request including a second code. The method also includes a third step of determining, at the authentication computing system, that the second code matches the first code and a fourth step of verifying, at the authentication computing system and based on the second code matching the first code, an identity of the first service provider. A fifth step includes providing, to the first service provider and via the authentication computing system, access to a first subset of information about the insured member.

In another aspect, a method of managing third-party access to insurance information is disclosed. The method includes a first step of receiving, at an authentication computing system for an insurer and from a first service provider, a first request to access information associated with an insured member, and a second step of verifying, at the authentication computing system, an identity of the first service provider. In addition, a third step includes identifying, at the authentication computing system, a service category for the first service provider by reference to a service provider database. A fourth step includes selecting, at the authentication computing system and from an insurance record including information for the insured member, a first subset of the information based on the identified service category, and a fifth step includes providing, to the first service provider and via the authentication computing system, access to only the first subset of information about the insured member.

In another aspect, a system for managing third-party access to insurance information includes a processor and machine-readable media. The machine-readable media include instructions which, when executed by the processor, cause the processor to generate, via an authentication computing system for an insurer and in response to a notification from an insured member, a first code, and to receive, at the authentication computing system and from a first service provider, a first request to access information associated with the insured member, the first request including a second code. In addition, the instructions cause the processor to determine, at the authentication computing system, that the second code matches the first code, and to verify, at the authentication computing system and based on the second code matching the first code, an identity of the first service provider. Finally, the instructions cause the processor to provide, to the first service provider and via the authentication computing system, access to a first subset of information about the insured member.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
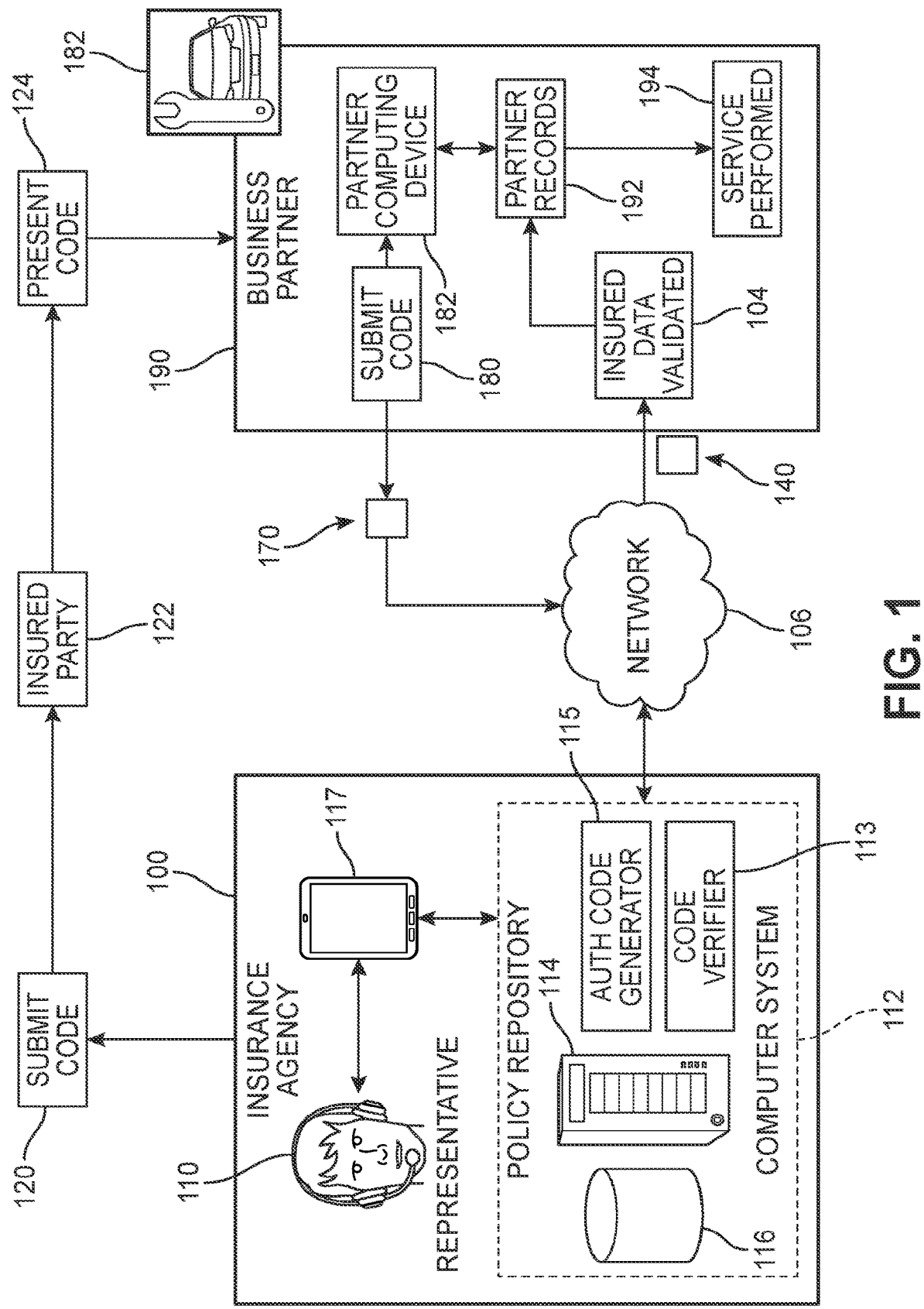
FIG. 1 is an overview of a scenario in which a code is generated for an insured member, and the code is submitted by a third-party service provider during an authentication event, according to an embodiment.

The embodiments describe a centralized method and system of managing third-party access to information stored in insurance records. The proposed embodiments provide a centralized insurance policy repository (e.g., a cloud storage system) that business partners can access following authentication. The cloud system is configured to streamline the authentication process and allow only those parties that can correctly verify their identity access to an insured member's policy information. This process will occur without the need for manual verification of credentials with an insurance representative, or requiring the business partner to repeatedly request access each time there is a need to review the member's details. The cloud system would expedite and automate what has traditionally been a process dependent on human-agent reviews and approval.

For purposes of this disclosure, third-parties can also be referred to as "service providers" or "business partners". The insurance providers ("insurers") will populate the insurance policy repository with data from their records for each of their members (i.e., insured individuals). While the examples depicted in the drawings will present cases in which access to automotive insurance information for a person is being managed, it should be understood that the proposed systems and methods can be readily extended to facilitate access management for information stored in association with a wide range of insurance coverage types, such as insurance directed to automobiles, homes, buildings, health, and other valuables.

In different embodiments, the proposed cloud system is configured to adapt to the communication protocol used by the business partner. For example, many autobody shops do not have sophisticated computer systems, and many still rely on very basic computer systems or fax machines. In one example, where the body shop has only a basic computer system, the insurance provider can provide a secure website where the body shop can enter a code. This code would have been previously provided to the member. The code can be in form of a bar code, a QR code, an alphanumeric string or any other printed code. In some embodiments, the website can then validate access by the body shop using an IP address, a browser cookie, or some other indicia that corresponds to the body shop's computer. In some embodiments, that indicia of origin can be combined with the code provided to the member to validate the body shop's access.

Once verified, the storage system would provide selected personal information to the body shop to facilitate funding of the repair. As one non-limiting example, the information revealed to the body shop could be automatically limited to: (1) a claim number, (2) a maximum coverage amount for the repair, (3) deductible, and (4) list of approved spare parts vendors. Thus, only information essential to the designated service provider would be revealed and other PII that may be part of the member's insurance record would not be revealed to the body shop.

In another example where the body shop may only have a fax machine, the body shop could be given a phone number (e.g., a special 1-800 number) where a fax with the code can be sent. The insurer would receive and review the fax from the body shop. In one embodiment, the insurer could use the calling party's number to verify that the fax came from the body shop. After verification, the insurer could send back a fax with only the limited information essential to the repair.

In some embodiments, prior to the body shop's communication with the insurer, the member can contact their insurer to initiate a claim and provide an FNOL (First Notice of Loss). Once the claim process has been initiated, the insurer can automatically select different sets of private data to send to different business partners. For example, the set of data sent to the body shop would differ from the set of data sent to a car rental business. These custom data sets would be created in anticipation of requests by business partners, or these data sets can be created on the fly when requested by a business partner.

As will be described in greater detail below, an authentication process and system based on the requester's submission of a code and location data may be utilized for reducing and in some cases eliminating the need for users to present credentials, input passwords, or otherwise offer identity tokens or factors, as well as curtail the use of video forgery to fraudulently access secured resources such as an insured's personal identifiable information (PII). Theft of personally identifiable (PII) from computers and online environments is particularly problematic and widespread. Public concern regarding the rapidly growing threat of personal identity theft has led to numerous companies offering specialized protection against such theft and/or monitoring of a consumer's credit and other accounts to detect unauthorized access, aimed at preventing or reducing risk of theft or misuse of personal and financial information. In order to ensure persons whose information is stored in the centralized system is protected, reliable and secure authentication is vital. The proposed systems balancing this need with an efficient, simplified access mechanism to the required information.

References to various aspects of access management will be discussed throughout the following disclosure, including identification, authentication, and authorization. For purposes of this application, the term 'identification' refers to the process of associating a party with something that has occurred on a server, on a network, or with some other resource, and typically occurs when a party (or any user) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of a third party based on the detection of a specific code and/or location data can be used to prove the user is the expected service provider. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. In different embodiments, the proposed systems and methods, the information stored by the insurance agency is a secured resource, and only select persons are authorized to view this information. In some embodiments, the selected persons or parties must be authenticated before being permitted to access the secured resources which they have been authorized to access. As will be discussed herein, a third party can be authorized by an insured person to access their insurance information, and embodiments of the proposed systems facilitate the authentication of such third parties before permitting this access. Furthermore, in some embodiments, the third party may be authorized to view only a subset of the larger record of information that is relevant or otherwise pertinent to the service for which they are being hired (e.g., see FIG. 7).

In different embodiments, organizations and businesses such as insurance agencies often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer (e.g., the insured) may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "insured" should be understood to refer to any end-user or person whose verified information has been stored in connection with an insurance computing system. A "user" can be understood to refer to a third party (not the insurance agency or insured member) that is seeking access to at least some of that information.

For purposes of introduction, an overview of one embodiment of the proposed systems and methods is illustrated with reference to FIG. 1. In FIG. 1, an example of an authentication process is shown in which a first user 102 (e.g., a business partner such as a car mechanic), in a first location 190, is submitting a request 170 to access information associated with an insured party 122. The request 170 is submitted to an insurance record repository computer system 112 associated with an insurance agency 100 during a communication session. In different embodiments, the term "computer system" can refer to the computing resources of a single computer, the partial computing resources of a single computer, a plurality of computers communicating with one another, or a network of remote servers. In one embodiment, computer system 112 includes at least one server having at least one processor.

In the embodiment of FIG. 1, computer system 112 includes one or more computing devices 114 (for example, a server) that may be in communication with one or more databases 116. Databases 116 could be co-located with computing devices 114 or could be remote databases that are accessible by computing devices 114 over a network. Databases 116 can include any kind of storage devices, including but not limited magnetic, optical, magneto-optical, and/or memory, including volatile memory and non-volatile memory. In an example embodiment, computer system 112 may also include or be configured with access to an access management system (see FIG. 2), of which an authentication code generator 115 and/or code verification module ("verification module") 113 can be components. In some embodiments, authentication code generator 115 and/or verification module 113 may be implemented in software, hardware, or a combination thereof. In different embodiments, the access management system can be configured to verify an identify of a person so as to either permit or deny access to the secured resources.

In different embodiments, prior to submission of request 170, the insured party 122 had reached out to or otherwise been in in communication with their insurance agency 100. In one example, the insured party 122 had initiated a claim for processing, for example during a phone call or in-app communication with a representative 110 over an agent device 117. In one embodiment, in response to the claim creation, the computer system 112 is configured to automatically generate a secure code 120 via an authentication code generator 115 which may be linked to the insurance record repository computer system 112. This code is secured transmitted or conveyed to the insured party 122, for example over a voice call with representative 110, over a chat window via agent device 117, through an in-app code presentation, text message (SMS), e-mail, etc. In some optional embodiments, the insured party 122 can indicate their preferred service provider(s) that should be linked to the code in order to increase security. Using agent device 117, representative 110 may be able to review customer records, view image data, send documents and forms to a customer, access security codes and other verification data, provide access to a secured resource, and/or perform other tasks required to assist customers or users.

Thus, for purposes of this example, insured party 122 has received code and, upon contacting their selected service provider (i.e., first user 102), presents or otherwise provides said code as a first code 124. In one example, the first user 102 having received the first code 124 from their customer (the insured party 122), and submits first code 124 in a code submission 180 with or following request 170. For example, the request 170 can occur over network 106 via their partner computing device 182. In other embodiments, first user 102 can engage in a communication session via a landline telephone, fax machine, or a computing device configured with a phone or other network connection 106, and so submit the first code 124 through whatever communication mechanism/device they have available to them.

For purposes of the example depicted in FIG. 1, first user 102 has available the partner computing device 182, which is on-site. In one embodiment, partner computing device 182 is a computing device such as a desktop, laptop, tablet, smartphone, smartwatch, or other computing device that can receive signals over a network and allows first user 102 to contact the computer system 112. In other embodiments, the first user 102 can be speaking and listening to representative 110, who can serve as a gateway to the computer system 112, over a telephone. In another example, the first user 102 can submit request 170 over a fax machine. For purposes of this example, the first user 102 is seeking access to account details for the insured party 122.

In different embodiments, the partner computing device 182 can include an electronics unit comprising a plurality of different components, such as one or more of various user interface components (e.g., a touchscreen or other display whose refresh rate can be manipulated, keyboard, mouse, microphone, camera, speaker, etc.), a user interface module, a processor, and/or a communication module. These devices may include a system including one or more processors and memory. Memory may comprise a non-transitory computer readable medium. Instructions stored within memory may be executed by the one or more processors. The partner computing device 182 may be configured to receive and analyze data from various input sensors associated with the device or data that is communicated from external components or devices to the device. In some cases, the partner computing device 182 may also include a navigation system equipped with a GPS receiver that can receive GPS information or other receivers capable of receiving global or local positioning information.

A communication module may allow the partner computing device 182 to communicate wirelessly. In this case, the communication occurs over a wireless connection (network 106); however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the partner computing device 182 may include a device display ("display") that can, for example, present information and various media for an insurance repository software application ("app"). In some embodiments, the app serves as an authenticator and access manager of the insured party's information. In some embodiments, the first user 102 can receive and send information through the app. A user interface may refer to an operating system user interface or the interface of one or more software applications that may run on partner computing device 182 or be accessed via a website or other remote site. In some embodiments, the user interface can include a messaging window or other chat-space by which a business partner or insurance agent may send/receive messages or other digital content. Alternatively, in some embodiments, the first user 102 can also speak with the service representative via a voice calling application, or directly through a telephone or other external device, while separately submitting request 170.

In one embodiment, partner computing device 182 could operate in a client-server relationship with one or more servers of computer system 112. For example, computer system 112 may include a server that communicates with partner computing device 182, as well as other remote devices (e.g., user devices of other customers) over network 106. The partner computing device 182 may provide the front-end of a system that provides users with options for performing various kinds of tasks (for example, requesting and accessing account information for a particular insured party following authentication). In some cases, partner computing device 182 may run client software through a web browser, in which case the client software may be hosted on a server associated with computer system 112. In other cases, partner computing device 182 may run client software in the form of a native software application that has been downloaded through a centralized marketplace (i.e., an "app store"). In some cases, while the client software that allows users to perform various tasks may be run on partner computing device 182, the data may be retrieved from and stored on databases associated with computer system 112 (e.g., databases 116).

In different embodiments, the remote access management system can automatically, or at a manual request of the insurance representative, initiate an authentication procedure, action, or task that includes a request for a code and/or location data for the business partner (first user 102). In some embodiments, in response to the submission of request 170 from first user 102 seeking access to an account or other secured resource associated with the insured party 122, the computer system 112 can be configured to compare the received first code 124 with the secure code 120 that had been generated and stored in the system. If the first code 124 matches the generated secure code 120, as determined by verification module 113, the system can process the request 170 and grant access and/or transmit information 140 to the business partner 102. In one example, the access allows the first user 102 to view the desired information via the app. In another example, a copy of the information will be transmitted to first user 102, for example, via e-mail, fax, telephone, text, etc. In FIG. 1, the information 140 includes validated insurance data 104 for the insured party 122 that was identified as necessary for the business partner to provide the desired service to the insured party 122. The information can then be reviewed as part of records 192 for the business partner 190, and relied on when approving and performing, as well as receiving compensation for, covered services 194 done on behalf of the insured party 122.

While in some embodiments the system may incorporate additional layers of authentication that may supplement the authentication process, such as location data, facial recognition, voice recognition, fingerprint recognition, password or pin-code verification, or other such factors, it may be appreciated that the system can be readily implemented without such additional steps. In other words, the first user 102 is able to obtain access to the required secured resources without waiting in a queue for someone to manually authenticate them and then verify insurance details.

Figure 2:
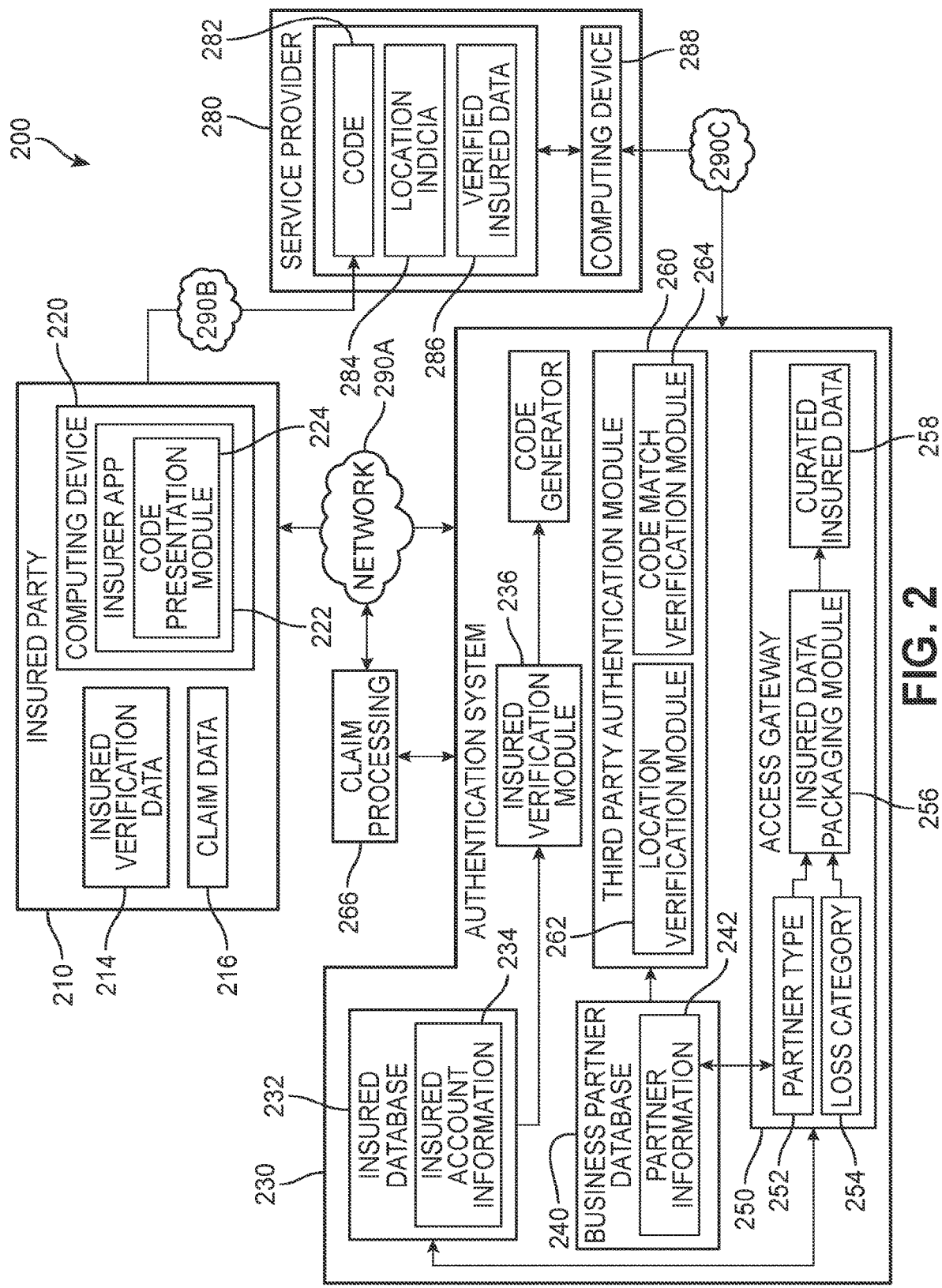
FIG. 2 is an overview of an environment of an information management access system, according to an embodiment.

In order to provide the reader with a greater appreciation of the embodiments, FIG. 2 depict an overview of an embodiment of an access management environment 200. In some embodiments, the environment 200 can include an authentication computing system ("authentication system" or simply "system") 230, an insured party 210, and a business partner (service provider) 280. The environment 200 is configured to manage third-party access to an insured's information stored in a central insurance record repository (shown here as an insured members database 232). In some embodiments, the insured members database 232 is a content library that stores account data related to one or more users (insured account information 234). The data may include, for a plurality of users, name, personal and professional details, user biometric data, PII, current and past policy history for the user, credit limit of users, family data, description of the insured object(s), banking credentials, among other details. External access to such information will only be permitted by authorized third parties who are authenticated by the authentication system 230 and have been pre-registered with said system 230 (i.e., are registered partners). It should be understood that the environment 200 is presented is for purposes of illustration only, and other embodiments may utilize different or additional components or processes. The environment 200 may alternatively include additional, fewer, or different components. For example, the environment may include additional storage devices, additional servers, additional computing devices, and other features not shown in FIG. 2.

In different embodiments, system 230 is hosted on a server or other computing system. Devices and components of environment 200 can communicate with each other and with other components of environment 200 over one or more networks (shown here as 290A, 290B, 290C and referred to collectively as networks 290). The networks 290 may comprise any number of electronic devices and use any number of communication protocols to facilitate data communications within the network 290. One having skill in the art would appreciate that the networks 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The networks 290 may include a physical and/or logical architecture defined by firewalls, proxy servers, routers, switches, or similar features that implement various levels of security and my function as logical gateways or boundaries.

In different embodiments, the system 230 is capable of communicating with external computing systems over network 290 using wired or wireless communication capabilities. In one embodiment, the system 230 can be understood to comprise a cloud-based server and may include computing devices comprising any number of components, such as a Network Interface Card (NIC), allowing the respective devices to receive, transmit, process, and store information from external computing systems. In other words, the environment 200 may include groups or subgroups of computing devices that can communicate with each other, but not necessarily with the computing devices in other groups or subgroups. The environment 200 may include computing devices of disparate types, having different types of hardware and software configurations and in a variety of different locations. In some cases, multiple devices or subsystems can be identified together as a single computing device.

It can be seen in FIG. 2 that, in some embodiments, insured computing device 220, service provider computing device ("partner device") 288, and system 230 can be configured to share data over networks 290. The system 230, insured computing device 220, and partner device 288 may each include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, smart watches, smart glasses, smart jewelry, smart apparel, laptops, notebooks, tablets, and others, and can include work stations, mainframes, non-portable computing systems, devices installed in structures, vehicles, and other types of installations.

Although not shown in FIG. 2, it should be understood that a virtual or human support agent can be connected to and interact with insured party 210 and/or service provider 280, for example via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, for example, the agent device can be connected to or include an internet customer interface for providing support specifically to customers or members who contact them via the Internet. As a general matter, support agent can refer to any person or personnel who offers the caller (or person who was called) assistance, and has access to features of the system 230 during the communication session with the customer.

While for purposes of simplicity the insured party 210 is shown as communicating with the authentication system 230 by use of a computing device in FIG. 2, it should be appreciated that in other embodiments, the insured party 210 can contact the insurer through other communication mediums, such as telephone, e-mail, in person, chat, messages, or videocall, etc. Thus, data can be exchanged between insured party 210 and system 230 without requiring the insured party 210 to have access to a computing device. In cases where the insured party 210 uses insured computing device 218 to initiate the claim process, the system 230 can be configured to, via an insured verification module 236 and with reference to insured account information 234 in the insured database 232, authenticate the insured party 210 prior to secure code generation. In some embodiments, this verification can occur upon receipt of specific insured verification data 214 (e.g., password, biometric data, tokens, etc.). This authentication can occur using any communication medium, including in person with an insurance representative. In some embodiments, the insured party 210 can communicate with the system 230 via an insurer-provided app ("insurer app") 222 running on their device or otherwise accessed over the network 290.

In different embodiments, insurer app 222 can also serve as a teleconferencing software application. For example, implementations described herein may be performed via any electronic communications between an agent and a insured person including, but not limited to, telephone, video telephone, chat (e.g., IM, Slack™, Jabber™), video chat (e.g., Skype™, MS Teams™, Zoom™, Facetime™), internet based meetings (e.g., WebEx™), custom call-center systems, and other conference call systems. In addition, application can be configured to present various interfaces by which users can interact with some features of system 230.

Once the insured party 210 has been authenticated, the system 230 can, in one embodiment, facilitate submission or creation of a claim for the insured party 210, for example via a claim processing system 266. In some embodiments, system 230 can be a separate system that is in communication with claim processing system 266 over a network, while in other embodiments, system 230 may be a component of the claim processing system 266. Similarly, insured database 232 and/or business partner database 240 can be components of system 230 (as depicted in FIG. 2) or accessed outside of system 230. Claim processing system 266 can open a new claim or manage previously created claims, and store and/or communicate claim data 216 to the insured party 210. In some embodiments, as soon as an insured party 210 is verified and/or a claim is opened on behalf of the insured party 210, a signal is automatically produced and transmitted to code generator 238 of system 230. In response, the code generator 238 will automatically generate a unique, secure code, which can then be communicated to the insured party 210. In cases where insured party 210 is authenticated via the insurer app 222, the code generator 238 can present the secure code using a code presentation module 224 for the insurer app 222. In some embodiments, the code presentation module 224 can display the code to the insured party 210, and permit subsequent viewing access to the code only when the insured party 210 has successfully logged back into the insurer app 222. In another example, the code may be recited verbally or sent via chat to the insured party, either by a virtual representative (chatbot) or a human representative.

In different embodiments, the insured party 210 can also be required to select or otherwise agree to pursue services only with those businesses that are partners with the insurance agency. In other words, only those service providers who have registered with the authentication system 230 and have been vetted and approved to interact with the insurance repository will be accepted. In some embodiments, the insured party 210 will be asked to schedule an appointment or otherwise work with a preferred service provider before a code will be generated or before a code will be considered activated. In some embodiments (not shown in FIG. 2) the system 230 can provide a secure scheduling service through which various participating vendors or service providers (also referred to herein as insurance repository participants, market participants, or partners) can offer or list their services. In other examples, the vendor may on their own website describe their status as a partner of the insurance agency to encourage customers to select them.

Thus, in some embodiments, the insured party 210 may select a service provider from a list of market participants in that area and service category as stored in a business partner database 240. The business partner database 240 can also include identifying details about each provider (partner information 242) such as their business credentials, years in service, customer ratings and reviews, location data, contact information, registration data, etc. In one embodiment, this vendor selection will be linked to the code, such that only the selected service provider will be able to obtain access using the secure code. In other words, if the secure code is somehow exposed to another third party, even if they are registered with the system and submit the correct code, they will not be allowed access to the insured's information because the insured party 210 had not pre-selected them. In other embodiments, the level of security may be less stringent, and the insured party may only be told that they must work with a vendor who is a registered partner—in such cases, the secure code will be valid if submitted by any of the vendors on the list. In still another embodiment, the secure code may only be valid for a specific window of time (i.e., the code will expire after "X" hours or days, and a new code will have to be generated for the insured party). In some embodiments, the code may only be valid when submitted by vendors who are identified as offering services related to the service category that is selected for the claim (e.g., "Automotive", "Mortgage", "Health", "Bank", "Repairs", "Rental Car", etc.). In such cases, as an example, if the claim falls under the "mortgage" category, but the code is submitted by a partner who works in repairs, the access request will be denied.

In some embodiments, the insured party 210 can in some cases further select or accepts a proposed time and date as appointment via system 230. The marketplace service then schedules an appointment for the user, or sends the selected provider a message on behalf of insured party 210. In some embodiments, the system 230 can be configured to send information about the insured party 210 to their preferred service provider which can include various details such as the purpose for the visit (e.g., repair of transmission), the general category of service (e.g., automotive), the time/date of the visit (e.g., Wed July 17 between 1:30 and 3:30 pm), and the name and/or contact information of the insured.

In different embodiments, when system 230 receives a request from service provider 280 for access to an insured party's information (access to which is managed by the system 230), the system 230 will require submission of a code. As a general matter, use of the term "code" can refer to any verification token, such as an alphanumeric code, encryption key, QR/Bar Code, image-based code, etc. While the code can be submitted electronically over network 290, for example via a website or app associated with the insurer, it should be appreciated that, in different embodiments, the system 230 can also accept code submissions as faxes displaying the code, voice calls in which the code is recited, and/or text messages in which the code is typed or an image captured of the code is transmitted. Thus, in order for the service provider 280 to proceed, the code that was received by the insured party 210 must have been relayed to the service provider 280. In other words, access to information will be restricted to (a) registered (known) business partners of the system, who (b) have been given a code by a prospective customer. In addition, the access will be extremely narrow, limited to the insured member account for which the code was generated, and to information in that account that is designated as appropriate to share (e.g., see FIG. 7).

In different embodiments, upon submission from the service provider of (a) a code 282 and (b) the customer's name or other identifier, third party authentication module 260 of system 230 will determine whether account information access should be granted to the service provider. For example, a code match verification module 264 is configured to determine if the code is correct based on its records for a member linked to said identifier and/or business partner information 242. If the code is correct in the context of the given insured party identified and service provider service category (based on the claim) and/or name (e.g., did the insured pre-select this provider?), the authentication module 260 can transmit a signal to an access gateway 250.

Additionally or alternatively, in some embodiments, the authentication module 260 can be configured to require an additional verification layer based on location data. For example, the location from which the service provider 280—as represented by location indicia 284 such as geo-data, IP address, a browser cookie, the caller's phone number, etc.—may be evaluated and compared to location information stored in business partner database 240. If the stored location data fails to match or align with the requester's location data, the request can be denied, even if the code submitted was correct.

In some embodiments, once the access gateway 250 receives a signal from authentication module 260 approving the request, the system 230 can be configured to ensure only the account information that is necessary for the service provider to perform the desired service is made available to the service provider. In one embodiment, insured account information 234 will be 'culled', removed, redacted, or otherwise pared before access is granted to the service provider based on one or more factors. In one example, the access gateway 250 will evaluate the requester's partner information 242. The partner information 242 can include categories and/or labels that were assigned to the partner at the time of registration that indicate the services or products that they offer (e.g., home repair, auto repair, personal possession repair, mortgage, lender, banking, flood damage, car rental, construction, builder supplies, etc.). In some embodiments, the insured account information 234 may be packaged into a variety of smaller information sets (subsets). Based on a service provider's classification(s) (referred to here as a "partner type" 252), only one specific subset of the insured account information will be presented or otherwise provided to the requester. In another embodiment, the claim itself (e.g., loss category 254) can determine the type and amount of information that is to be provided. For example, if the insured party submitted information for a claim under a loss category such as "home storm damage", the subset of information that can be made available in conjunction with that loss category will differ than a claim that fell under a loss category such as "car accident".

In some embodiments, this 'packaging' of account data into smaller subsets can have been performed in advance of any claim submissions or third-party information requests, or in response to such submissions and/or requests. In FIG. 2, once the access gateway 250 identifies the partner type 252 and/or loss category 254, an insured data packaging module 256 is configured to cull or select only that account data which falls under the data classes permitted for viewing by the third party. The resulting subset, or curated insurance data 258, can then be provided to the service provider 280, for example via partner device 288, which will be received as verified insurance data 286. In some embodiments, the access is one-time only, and the partner must resubmit the request and code to view the information again. In other embodiments, the access is permanent, in that the information is e-mailed or faxed or otherwise communicated outside of the insurance agency's system. In yet another embodiment, the access can be valid for a preset duration, such as several days, one week, one month, etc., and then expire (no longer be valid for access to the information). In some cases, the third party's access to the subset of insured's information can be permitted until the claim is marked as processed and complete at the claim processing system 266, and then be revoked.

Figure 3A:
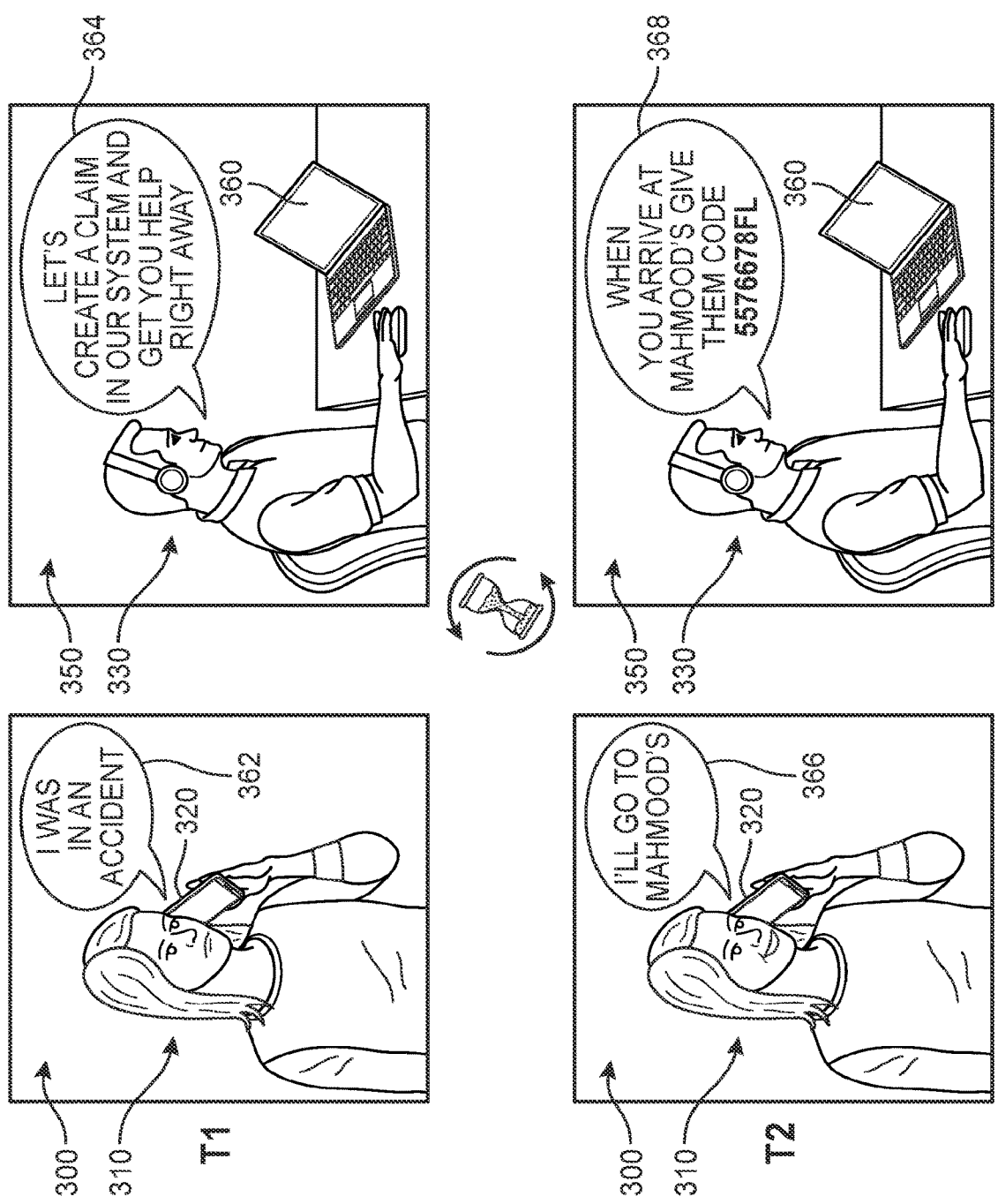
FIGS. 3A and 3B show a first example of an insured party receiving a code and presenting the code to a service provider, according to an embodiment.
Figure 3B:
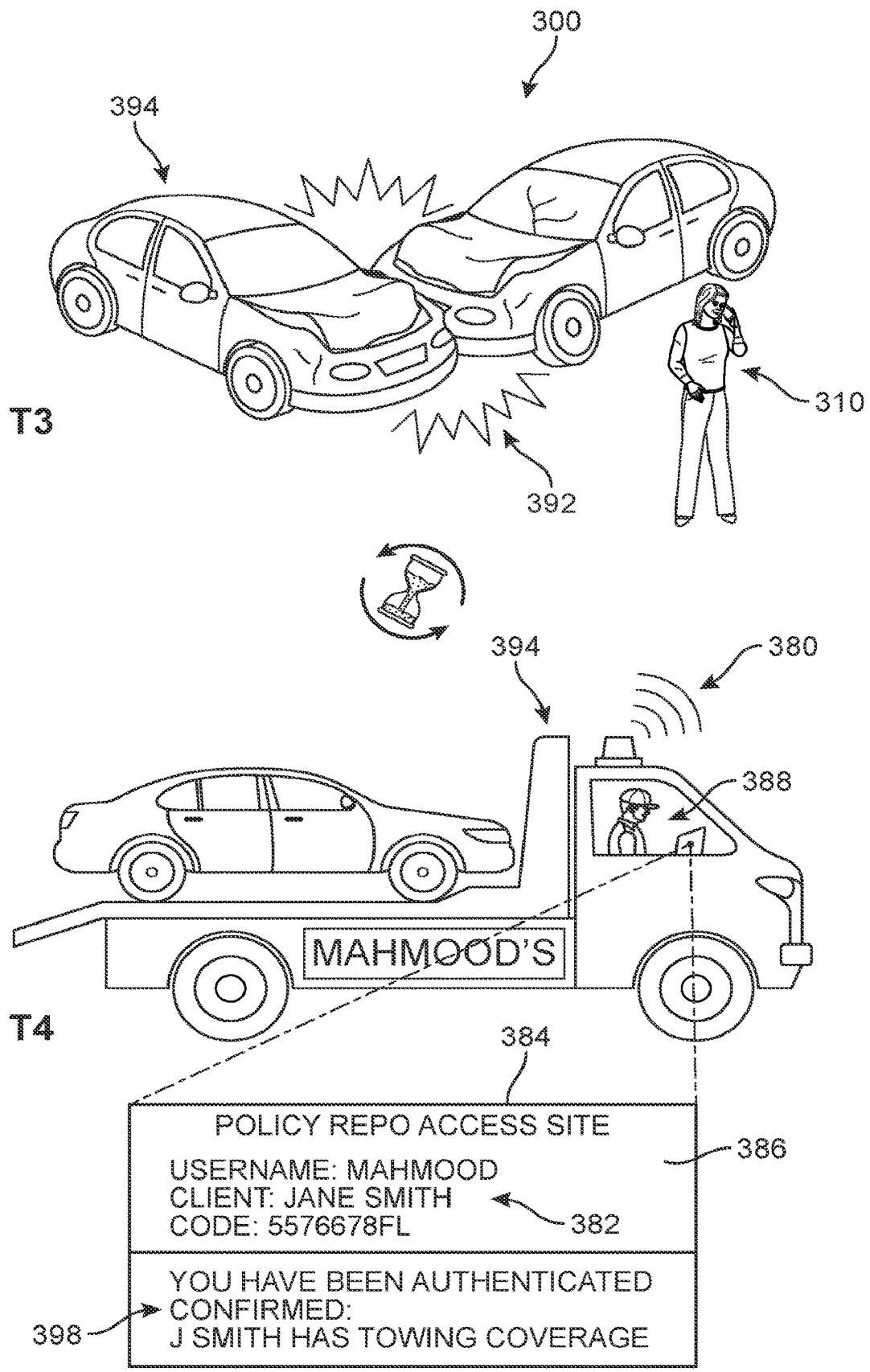
Figure 4:
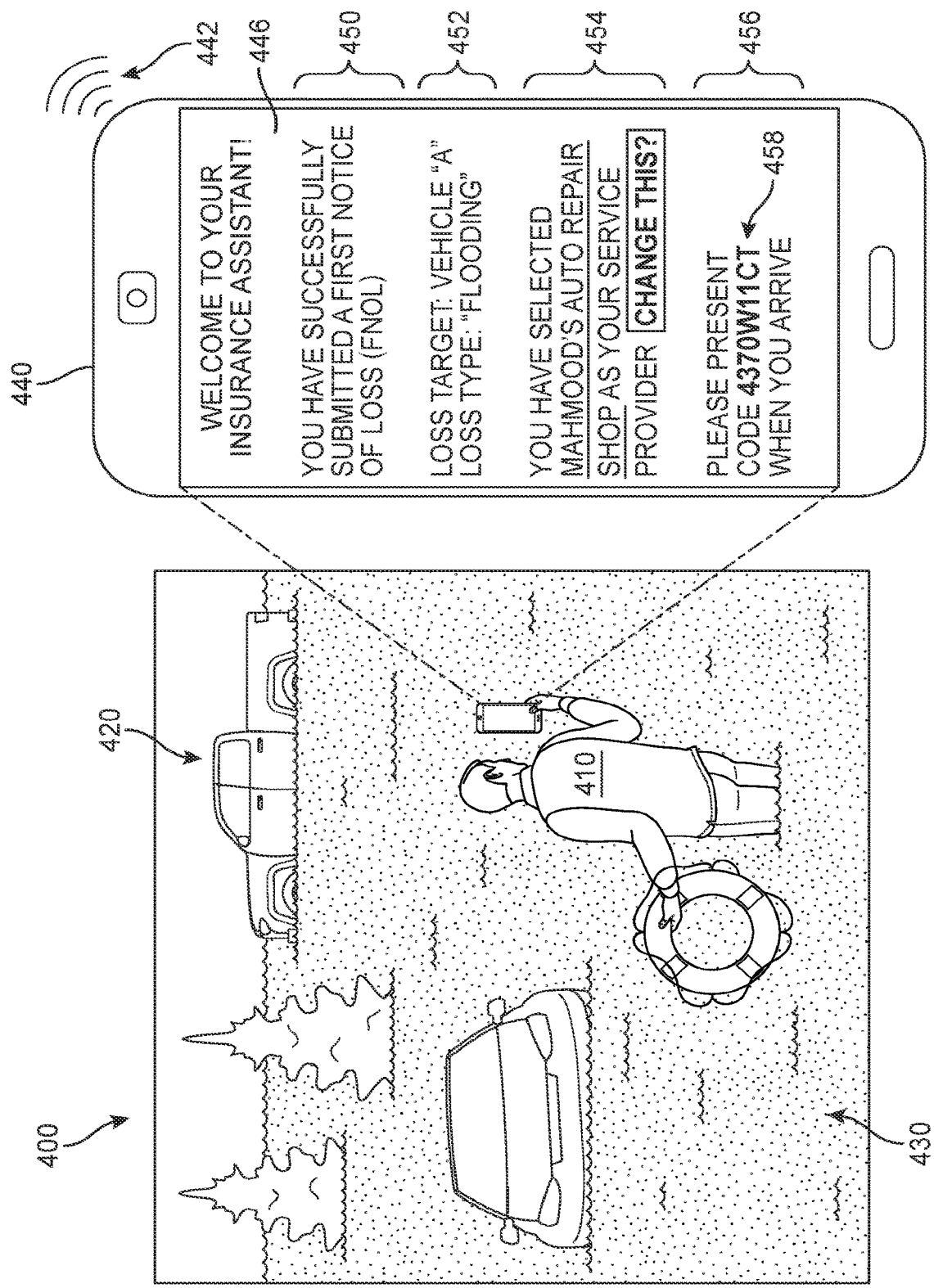
FIGS. 4 and 5 show a second example of an insured party receiving a code via an app and presenting the code to a service provider, according to an embodiment.

Referring now to FIGS. 3-6, an example of an authentication scenario is presented. For purposes of illustration, two examples of insured parties submitting an FNOL following an automotive loss are shown in FIGS. 3A-4. In the first example of FIGS. 3A and 3B, at a first time T1, a first insured party 310 near an accident site 300 is calling on a phone 320 (which may or may not including a computing device) to report 362 ("I was in an accident . . . ") her loss to her insurance agency 350. An insurance representative 330 listens to her report and initiates an FNOL 364 ("Let's create a claim in our system and get you help right away") for submission to the claim processing and authentication systems via agent computing device 360. The conversation continues to a second time T2, where the first insured party 310 has been asked to select her preferred service provider. In some embodiments, the insurance representative 330 can verbally offer a list of business partners for her to choose from, while in other embodiments, the first insured party 310 can indicate her choice at a later time, or the code can be independent of any choice, as described above. The first insured party 310 decides to select Mahmood's 366 ("I'll go to Mahmood's") and the insurance representative 330 enters this selection into the system, which generates a code 368 ("When you arrive at Mahmood's give them code 5576678FL") that he communicates to the first insured party 310.

In FIG. 3B, at a third time T3, the first insured party 310 is next shown calling the service provider while waiting near the accident site 300 where her vehicle 394 has been involved in and damaged in a collision 392. When a tow truck 390 for Mahmood's arrives at the scene at a fourth time T4, the first insured party 310 provides the secure code to the driver, who is an agent 388 of Mahmood's (a business partner registered as a user of the insurance policy repository). The agent 388 enters login information 382 ("Username: Mahmood/Client: Jane Smith/Code: 5576678FL" into an access manager site 386 for the repository via a portable computing tablet device 384, which transmits the information 382 to the authentication system over a network 380. The authentication system verifies the login information and grants the agent 388 (who is on-site at the accident scene) immediate access to a subset of validated information 398 for Jane Smith ("You have been authenticated. Confirmed: J. Smith has towing coverage . . . "), allowing the tow operator to approve the towing service without delay and without requiring payment from the first insured party 310, thereby expediting and simplifying the process for both the insured party and the business partner. There is no longer a need for either party to wait for approval or for the business partner to manually request validation of the information that was provided to them by the insured party.

In a second example, shown in FIG. 4, a second insured party 410 is accessing insurance app 442 via a mobile computing device 440 in order to submit an FNOL 450 for his insured truck 420, which is submerged in water 430 during a flood 400. As shown in FIG. 4, in different embodiments, a user can communicate via an interface generated by a communications application. The application can offer a user interface that may be accessed via any user computing device configured for connection to a network. In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types).

Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video or other media associated with a user interface, or other such information presentation.

As shown in FIG. 4, second insured party 410 enters his information in the insurance app 442, which is transmitted to the remote claim processing and authentication systems over network 442. In response, the insurance app 442 provides a summary 452 of the loss ('Loss target: Vehicle "A", Loss type: flooding'), and a message 454 reminding him of his preferred business partner ("You have selected Mahmood's Auto Repair Shop as your service provider" with a selectable option to change this selection to a different registered business partner). Furthermore, the insurance app 442 presents secure code 458 with instructions 456 ("Please present code 4370W11CT when you arrive").

Figure 5:
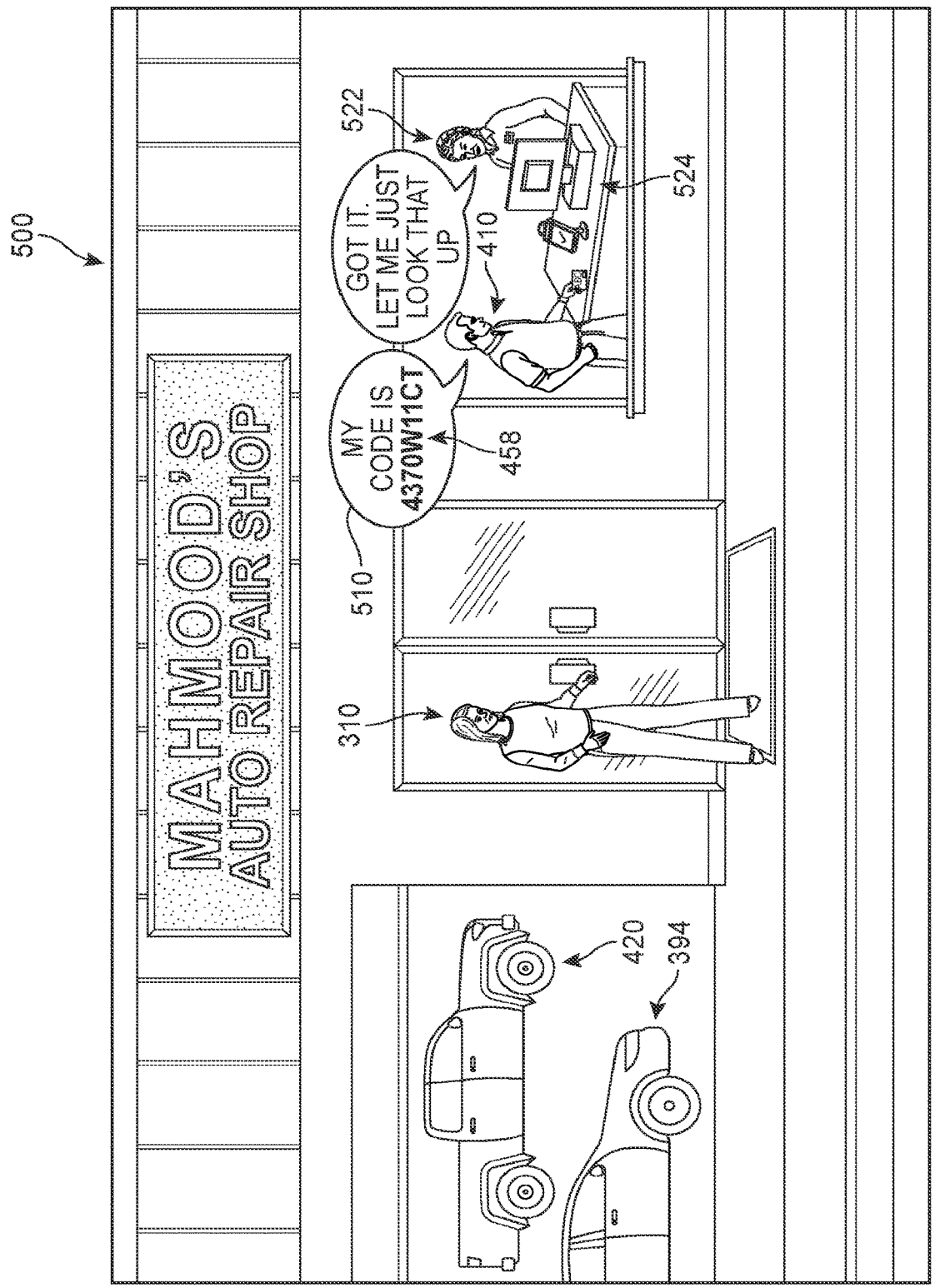

The second insured party 410 is depicted arriving with his truck 420 at auto repair shop 500 ("Mahmood's Auto Repair Shop") in FIG. 5 after having obtained his code. The second insured party 410 approaches a customer representative 522 of Mahmood's in order to initiate repair of his truck 420. The customer representative 522 enters the name of second insured party 410 into the authentication system access via an on-site computing device 524. When asked, the second insured party 410 provides the code 458 in a first verbal exchange 510 ("My code is 4370W11CT"), which the customer representative 522 submits to the remote authentication system with a request for access.

Figure 6:
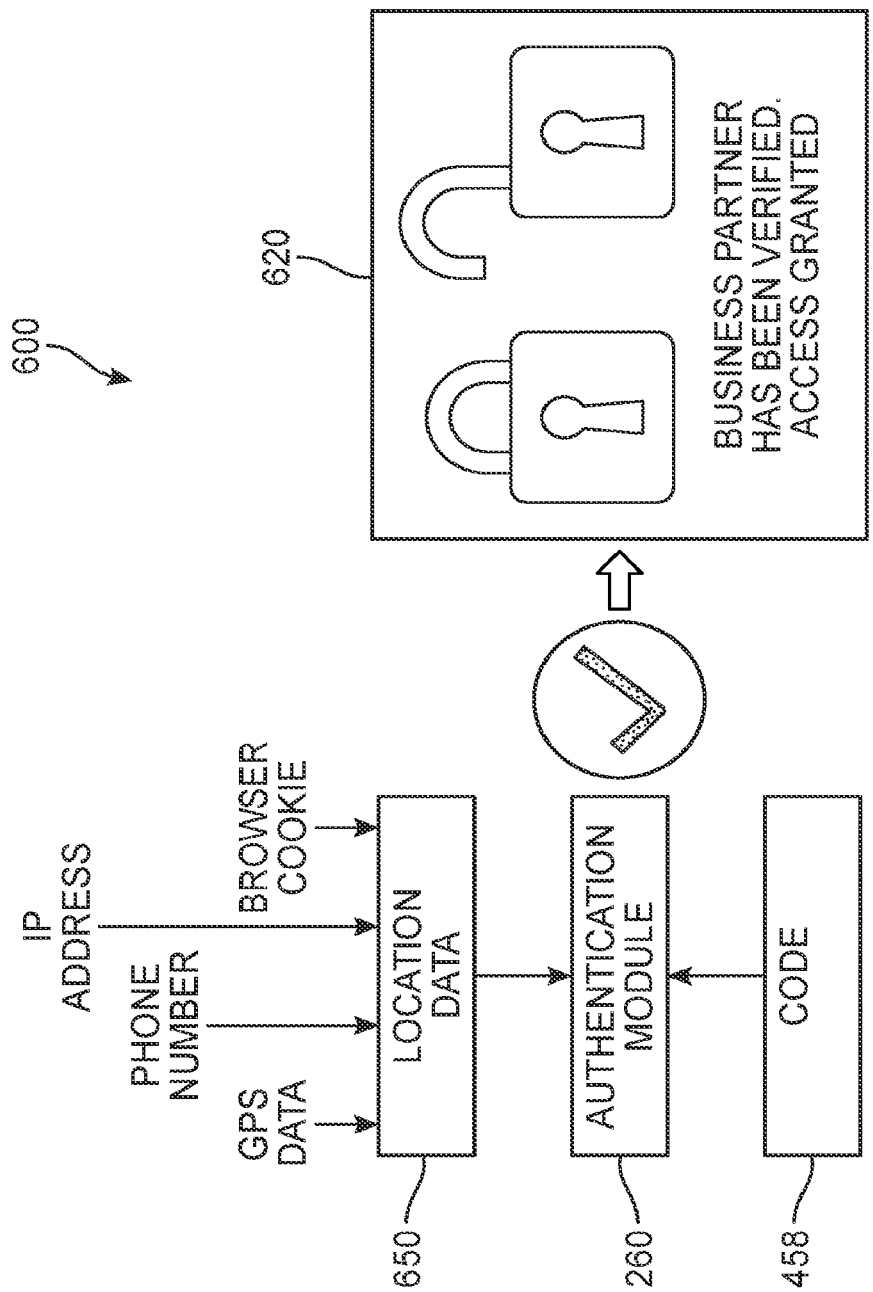
FIG. 6 is a schematic diagram depicting a process by which a service provider is authenticated based on location data and a code, according to an embodiment.

FIG. 6 is a flow diagram that schematically illustrates the submission of authentication data from the business partner to the authentication module 260. In different embodiments, code 458 will be submitted and verified by authentication module 260 in order to grant access 620. In addition, in some embodiments, location data 650—obtained as GPS data, the originating/source phone number, browser cookie(s), and/or IP address associated with the source requesting access, etc.—can be used to determine whether the submission is being generated at a location that is known to host the business partner. This determination will provide an additional layer of verification before granting access 620.

Figure 7:
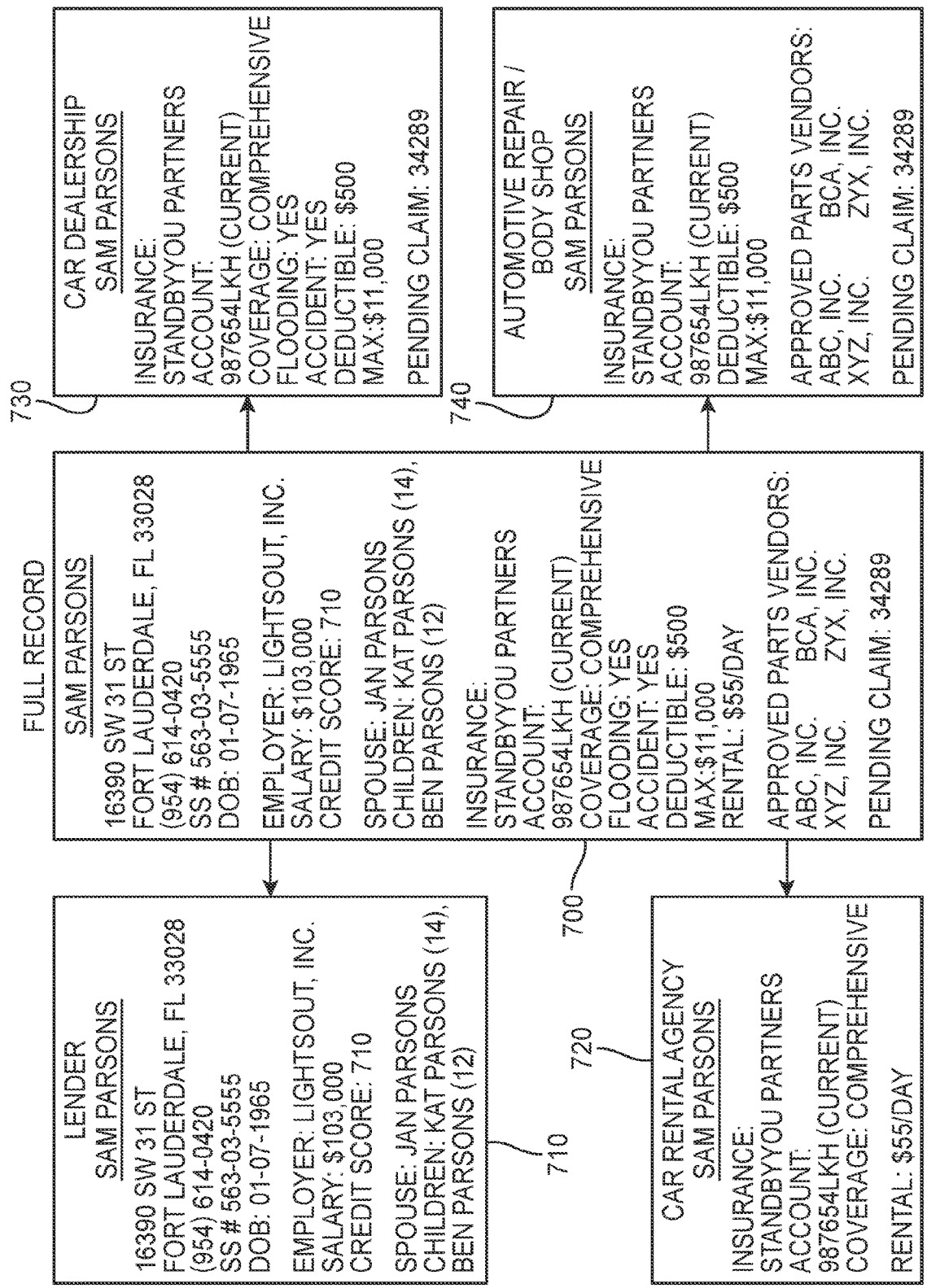
FIG. 7 is an example of different subsets of information about an insured member that can be produced for different types of third-parties, according to an embodiment.

In different embodiments, once the user has been authenticated, the authentication system can be configured to grant access only to that account information which has been identified as being relevant to the service provided by the business provider. Simply for purposes of illustration, some examples of this are shown in FIG. 7. In this example, the authentication system has access to an insured database in which account information for second insured party "Sam Parsons" is stored. The repository stores what will be referred to as a full record 700 for its member, which can include a variety of PII and non-PII information, such as address, phone number, social security number, date of birth, employer, salary, credit score, family data, insurance policy data (e.g., insurance type, name, account number, coverage type, covered services, deductible, maximum coverage, rental policy, approved parts vendors, etc.), and claim information. The full record 700, representing an unfiltered whole view of the member's information, is shown simply as an example; thus, it should be understood that information for a member can differ widely from the information shown in FIG. 7.

For purposes of this example, curated records (subsets) that can be automatically produced in lieu of the full record 700 are depicted. In some embodiments, the amount and categories of information will vary based on the type of service provider requesting the information. In a first example, in cases where a financial institution such as a mortgage lender or banking institution makes the request, the authentication system will automatically curate the full record 700 to produce a lender record 710. The lender record 710 has limited information about the second insured party "Sam Parsons" that includes a first subset of data with address, phone number, social security number, date of birth, employer, salary, credit score, and family data, which is all the information that has been deemed by the authentication system to be required for a business partner providing lending services (for purposes of this example).

In a second example, in cases where a rental agency such as a car rental business makes the request, the authentication system will automatically curate the full record 700 to produce a car rental agency record 720. The car rental agency record 720 has limited information about the second insured party "Sam Parsons" that includes a second subset of data with insurance name, account, coverage type, and rental policy information, which is all the information that has been deemed by the authentication system to be required for a business partner providing car rental services (for purposes of this example).

In a third example, in cases where an automotive sales business such as a car dealership makes the request, the authentication system will automatically curate the full record 700 to produce a car dealership record 730. The car dealership record 730 has limited information about the second insured party "Sam Parsons" that includes a third subset of data with insurance name, account, coverage type, covered services, maximum coverage, deductible, and the claim information, which is all the information that has been deemed by the authentication system to be required for a business partner providing car dealership services (for purposes of this example).

In a fourth example, in cases where an automotive mechanic such as a automotive repair or body shop makes the request, the authentication system will automatically curate the full record 700 to produce an automotive repair/body shop record 740. The automotive repair/body shop record 740 has limited information about the second insured party "Sam Parsons" that includes a fourth subset of data with insurance name, account, coverage type, maximum coverage, deductible, approved parts vendors, and the claim information, which is all the information that has been deemed by the authentication system to be required for a business partner providing car repair services (for purposes of this example).

Figure 8A:
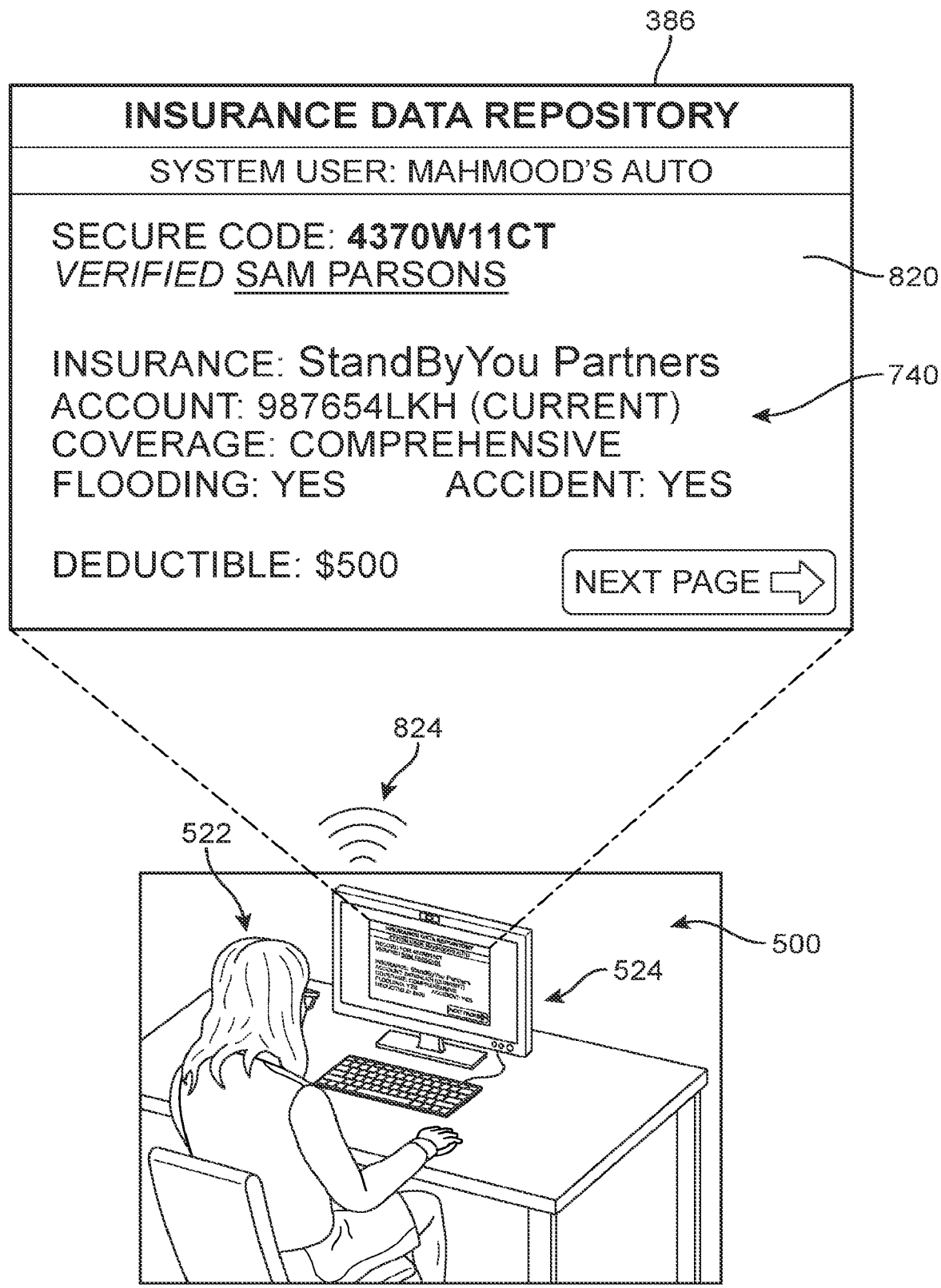
FIGS. 8A and 8B depict two examples of an authentication system causing a limited amount of information about an insured member to be presented to a service provider, according to an embodiment.
Figure 8B:
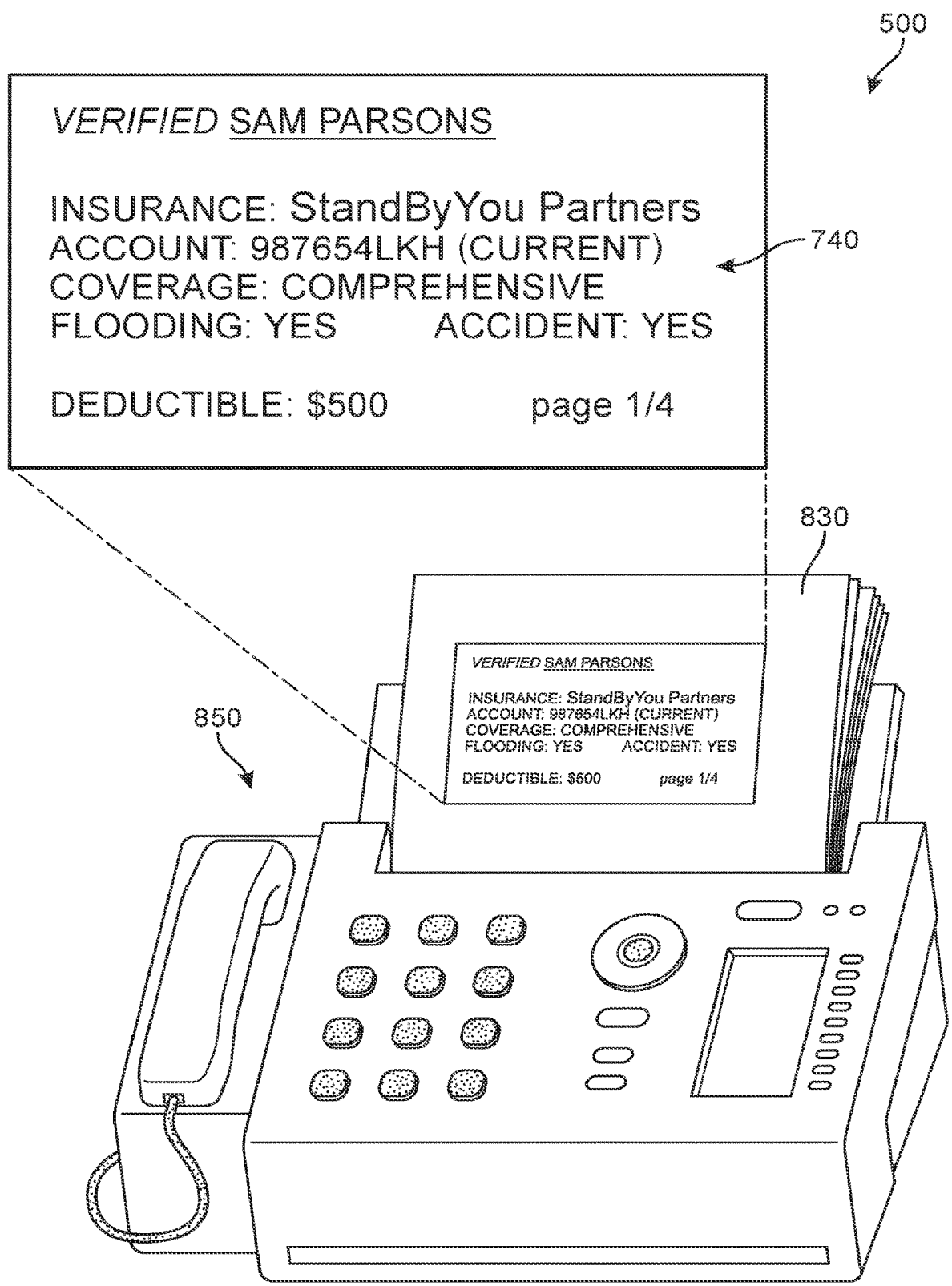

Referring now to FIGS. 8A and 8B, two examples of information access are shown. In the first example depicted in FIG. 8A, having been granted access, the customer representative 522 is using on-site computing device 524 to view the information for the second insured party. In this case, being an automotive repair shop, the access is limited to the fourth subset of data, or automotive repair/body shop record 740. The record is viewed online via the access site 386 for the insurance data repository, transmitted over network 824. This information can be printed or stored electronically for the shop's reference. In a second example shown in FIG. 8B, the request was made over a fax machine 850 at the auto repair shop 500. In response, upon access being granted, the fourth subset of data (automotive repair/body shop record 740) is faxed as a hard copy 830 which can be stored as part of the shop's records.

Figure 9:
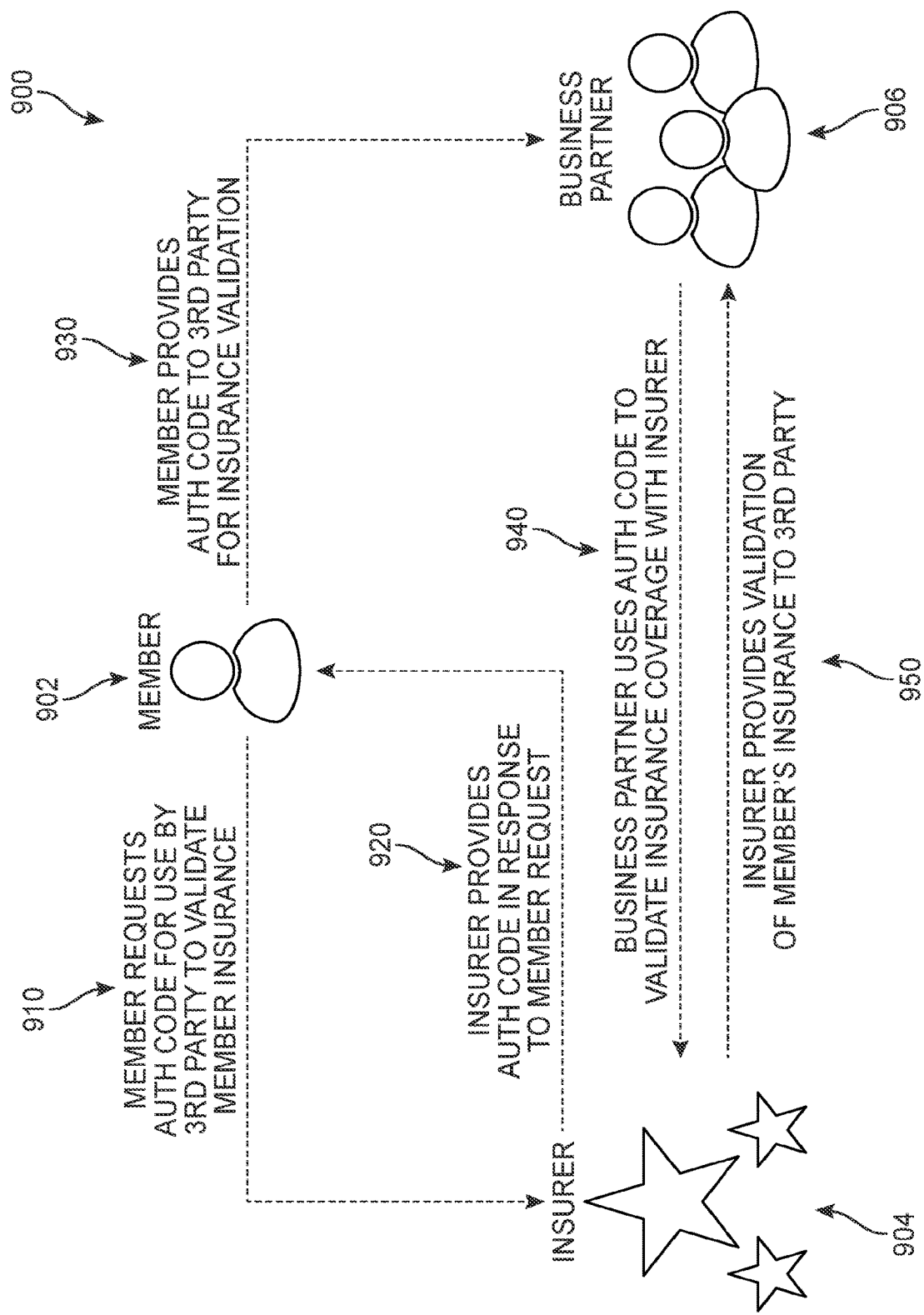
FIG. 9 is a flow diagram depicting a process of authenticating a third-party for purposes of accessing information from an insurance policy repository.

For purposes of clarity, one example of an informational access flow 900 presenting a high-level view of the authentication process is shown in FIG. 9. In a first stage 910, an insured member 902 contacts their insurer 904 and requests an authentication code for use by a third party to validate their member insurance details. In a second stage 920, the insurer 904 provides an authentication code in response to the member's request. In a third stage 930, the member 902 will provide the authentication code to their selected third party (business partner 906) for insurance validation. During a fourth stage 940, the business partner 906 uses the authentication code to validate the member's insurance coverage with the insurer 904. Finally, in a fifth stage 950, the insurer 904 will provide validation of the member's insurance to the third party (business partner 906).

Figure 10:
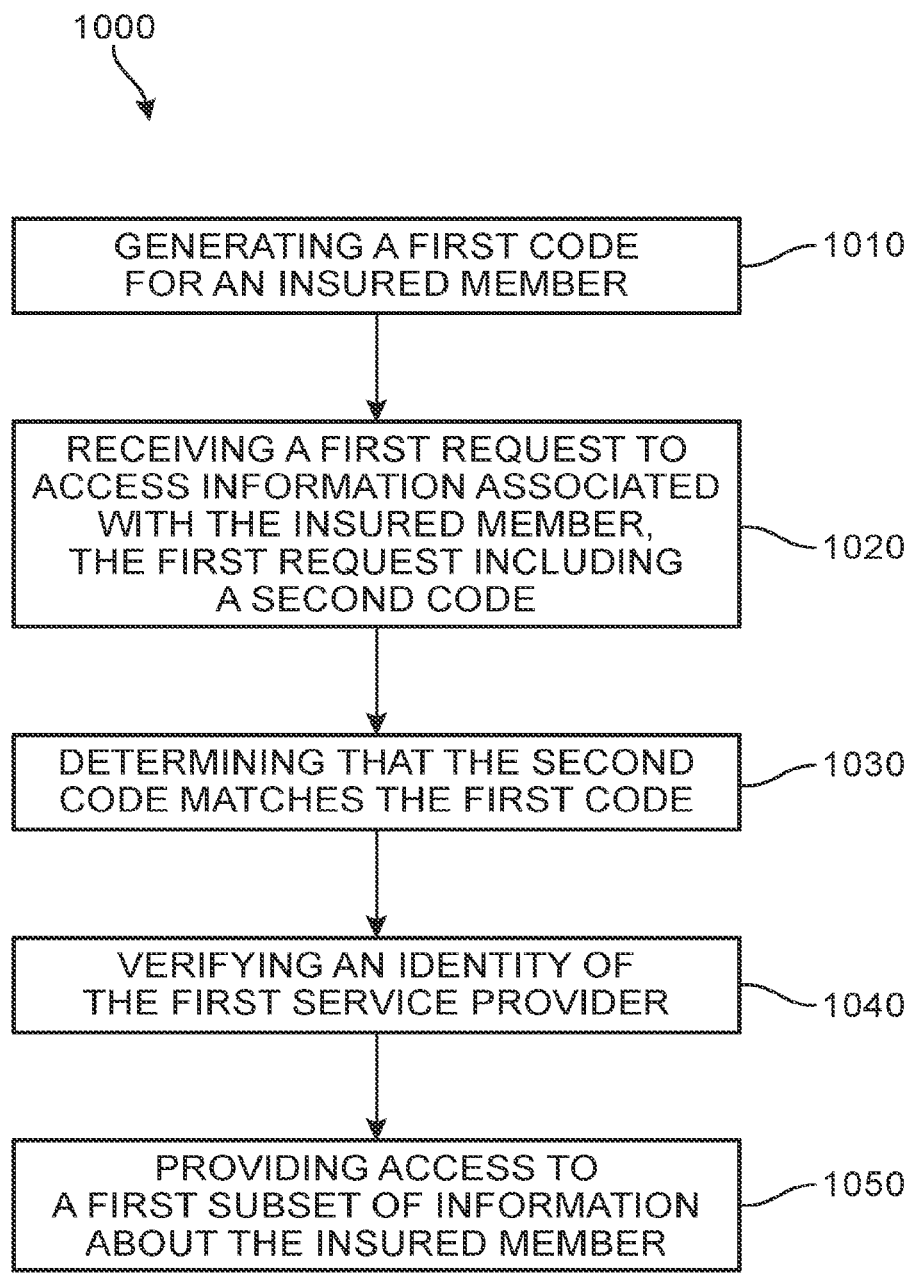
FIG. 10 is a flow chart depicting a process of managing third-party access to insurance information, according to an embodiment.

FIG. 10 is a flow chart illustrating an embodiment of a method 1000 of managing third-party access to validated insurance information. The method 1000 includes a first step 1010 of generating, via an authentication computing system for an insurer and in response to a notification from an insured member (a policy member of the insurer's insurance), a first code. In other words, the code is initially generated for and provided to the insured member. Thus, no one else will have access to the secure code other than the insurer and whomever the insured member subsequently shares the code with. A second step 1020 includes receiving, at the authentication computing system and from a first service provider, a first request to access information associated with the insured member, the first request including a second code. (At this point, the first service provider can be understood to have received a code from the insured member who has elected to patronize first service provider's business.) The method 1000 also includes a third step 1030 of determining, at the authentication computing system, that the second code matches the first code and a fourth step 1040 of verifying, at the authentication computing system and based on the second code matching the first code, an identity of the first service provider. A fifth step 1050 includes providing, to the first service provider and via the authentication computing system, access to a first subset of information about the insured member.

In other embodiments, the method may include additional steps or aspects. In one example, the method 1000 also includes steps of receiving, at the authentication computing system, first location data for the first service provider, retrieving, via the authentication computing system, second location data linked to the first service provider from a service provider database, and further verifying, at the authentication computing system and based on the first location data matching the second location data, an identity of the first service provider. In another example, the method 1000 further includes a step of transmitting, from the authentication system, the first code via an application associated with the insurer running on a computing device for the insured member. In some embodiments, the method 1000 also includes receiving, at the authentication computing system and from the insured member, a selection of the first service provider, and the first code is valid only for the first service provider.

In one embodiment, the first request is submitted to the authentication computing system via a fax machine for the first service provider. In another embodiment, the first request is submitted to the authentication computing system via a website associated with the insurer accessed over a network by the first service provider. In some embodiments, the method 1000 also includes steps of receiving, at the authentication computing system and from a second service provider, a second request to access information associated with the insured member, the first request including a third code, determining, at the authentication computing system, that the third code matches the first code, determining, at the authentication computing system, that the first code is valid only for the first service provider, and denying the second service provider access to any information about the insured member. In different embodiments, the method 1000 also includes steps of receiving, at the authentication computing system and from a second service provider, a second request to access information associated with the insured member, the second request including a third code, determining, at the authentication computing system, that the third code matches the first code, verifying, at the authentication computing system and based on the third code matching the first code, an identity of the second service provider, and providing, to the second service provider and via the authentication computing system, access to a second subset of information about the insured member that differs from the first subset of information. In one example, the notification corresponds to creation of an FNOL (first notice of loss) submitted on behalf of the insured member.

Other methods may be contemplated within the scope of the present disclosure. For example, in some embodiments, a method of managing third-party access to insurance information is disclosed. The method includes a first step of receiving, at an authentication computing system for an insurer and from a first service provider, a first request to access information associated with an insured member, and a second step of verifying, at the authentication computing system, an identity of the first service provider. In addition, a third step includes identifying, at the authentication computing system, a service category for the first service provider by reference to a service provider database. A fourth step includes selecting, at the authentication computing system and from an insurance record including information for the insured member, a first subset of the information based on the identified service category, and a fifth step includes providing, to the first service provider and via the authentication computing system, access to only the first subset of information about the insured member.

In such embodiments, the method may include additional steps or aspects. In some embodiments, the method also includes steps of generating, via the authentication computing system and in response to a notification from the insured member, a first code, receiving, at the authentication computing system and from the first service provider, a first request to access information associated with the insured member, the first request including a second code, determining, at the authentication computing system, that the second code matches the first code, and verifying, at the authentication computing system and based on the second code matching the first code, an identity of the first service provider.

It is appreciated that methods in accordance with the present disclosure can include any combination of the aspects and features described herein. That is, methods and systems in accordance with the present disclosure are not limited to the combinations of aspects and features specifically described herein, but also include any other combination of the aspects and features that can be implemented.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of managing third-party access to insurance information implemented by an authentication computing system of an insurer including at least one processor, the method comprising:

in response to receiving a notification from an insured member, generating, via the authentication computing system of the insurer, a first code, wherein the first code is a secure code that is unique to the insured member;

receiving, at the authentication computing system and from a computing device of a first service provider, a first request to access information associated with the insured member, the first request including a second code;

determining, at the authentication computing system, that the second code matches the first code generated in response to the notification from the insured member;

verifying, at the authentication computing system and based on the second code matching the first code, an identity of the first service provider, wherein the first service provider is registered with the authentication computing system and wherein the identity of the first service provider is stored in a service provider database accessible by the authentication computing system; and providing, to the first service provider and via the authentication computing system, access to a first subset of information about the insured member, wherein the first subset of information is based on a category or label assigned to the first service provider when the first service provider registered with the authentication computing system.

2. The method of claim 1, further comprising:
receiving, at the authentication computing system, first location data for the first service provider;
retrieving, via the authentication computing system, second location data linked to the first service provider from the service provider database; and
further verifying, at the authentication computing system and based on the first location data matching the second location data, the identity of the first service provider.

3. The method of claim 1, further comprising transmitting, from the authentication system, the first code for presentation via an application associated with the insurer running on a computing device of the insured member.

4. The method of claim 1, further comprising receiving, at the authentication computing system and from the insured member, a selection of the first service provider, and the first code is valid only for the first service provider.

5. The method of claim 1, wherein the first request is submitted to the authentication computing system via a fax machine for the first service provider.

6. The method of claim 1, wherein the first request is submitted to the authentication computing system via a website associated with the insurer accessed over a network by the first service provider.

7. The method of claim 4, further comprising:
receiving, at the authentication computing system and from a computing device of a second service provider, a second request to access information associated with the insured member, the first request including a third code;
determining, at the authentication computing system, that the third code matches the first code generated in response to the notification from the insured member;
determining, at the authentication computing system, that the first code is valid only for the first service provider; and
denying the second service provider access to any information about the insured member.

8. The method of claim 1, further comprising:
receiving, at the authentication computing system and from a computing device of a second service provider, a second request to access information associated with the insured member, the second request including a third code;
determining, at the authentication computing system, that the third code matches the first code generated in response to the notification from the insured member;
verifying, at the authentication computing system and based on the third code matching the first code, an identity of the second service provider stored in the service provider database accessible by the authentication computing system; and providing, to the second service provider and via the authentication computing system, access to a second subset of information about the insured member that differs from the first subset of information, wherein the second subset of information is based on a category or label assigned to the second service provider when the second service provider registered with the authentication computing system and wherein the category or label assigned to the second service provider is different from the category or label assigned to the first service provider.

9. The method of claim 1, wherein the notification corresponds to creation of an FNOL (first notice of loss) submitted on behalf of the insured member.

10. A method of managing third-party access to insurance information implemented by an authentication computing system of an insurer including at least one processor, the method comprising:
receiving, at the authentication computing system for an insurer and from a computing device of a first service provider, a first request to access information associated with an insured member;
verifying, at the authentication computing system, an identity of the first service provider, wherein the first service provider is registered with the authentication computing system and wherein the identity of the first service provider is stored in a service provider database accessible by the authentication computing system;
identifying, at the authentication computing system, a service category for the first service provider by reference to the service provider database;
selecting, at the authentication computing system and from an insurance record including information for the insured member, a first subset of the information based on the identified service category assigned to the first service provider when the first service provider registered with the authentication computing system; and
providing, to the first service provider and via the authentication computing system, access to only the first subset of information about the insured member.

11. The method of claim 10, further comprising:
in response to receiving a notification from an insured member, generating, via the authentication computing system, a first code, wherein the first code is a secure code that is unique to the insured member;
receiving, at the authentication computing system and from the computing device of the first service provider, a first request to access information associated with the insured member, the first request including a second code;
determining, at the authentication computing system, that the second code matches the first code generated in response to the notification from the insured member; and
verifying, at the authentication computing system and based on the second code matching the first code, the identity of the first service provider.

12. A system for managing third-party access to insurance information, the system comprising a processor and machine-readable media including instructions which, when executed by the processor, cause the processor to:
in response to receiving a notification from an insured member, generate, via an authentication computing system for an insurer, a first code, wherein the first code is a secure code that is unique to the insured member;
receive, at the authentication computing system and from a computing device of a first service provider, a first request to access information associated with the insured member, the first request including a second code;

determine, at the authentication computing system, that the second code matches the first code generated in response to the notification from the insured member;

verify, at the authentication computing system and based on the second code matching the first code, an identity of the first service provider, wherein the first service provider is registered with the authentication computing system and wherein the identity of the first service provider is stored in a service provider database accessible by the authentication computing system; and provide, to the first service provider and via the authentication computing system, access to a first subset of information about the insured member, wherein the first subset of information is based on a category or label assigned to the first service provider when the first service provider registered with the authentication computing system.

13. The system of claim 12, wherein the instructions further cause the processor to:

receive, at the authentication computing system, first location data for the first service provider;

retrieve, via the authentication computing system, second location data linked to the first service provider from the service provider database; and further verify, at the authentication computing system and based on the first location data matching the second location data, the identity of the first service provider.

14. The system of claim 12, wherein the instructions further cause the processor to transmit, from the authentication system, the first code via an application associated with the insurer running on a computing device for the insured member.

15. The system of claim 12, wherein the instructions further cause the processor to receive, at the authentication computing system and from the insured member, a selection of the first service provider, and the first code is valid only for the first service provider.

16. The system of claim 12, wherein the first request is submitted to the authentication computing system via a fax machine for the first service provider.

17. The system of claim 12, wherein the first request is submitted to the authentication computing system via a website associated with the insurer accessed over a network by the first service provider.

18. The system of claim 15, wherein the instructions further cause the processor to:

receive, at the authentication computing system and from a computing device of a second service provider, a second request to access information associated with the insured member, the first request including a third code;

determine, at the authentication computing system, that the third code matches the first code generated in response to the notification from the insured member;

determine, at the authentication computing system, that the first code is valid only for the first service provider; and deny the second service provider access to any information about the insured member.

19. The system of claim 12, wherein the instructions further cause the processor to:

receive, at the authentication computing system and from a computing device of a second service provider, a second request to access information associated with the insured member, the second request including a third code;

determine, at the authentication computing system, that the third code matches the first code generated in response to the notification from the insured member;

verify, at the authentication computing system and based on the third code matching the first code, an identity of the second service provider stored in the service provider database accessible by the authentication computing system; and provide, to the second service provider and via the authentication computing system, access to a second subset of information about the insured member that differs from the first subset of information, wherein the second subset of information is based on a category or label assigned to the second service provider when the second service provider registered with the authentication computing system and wherein the category or label assigned to the second service provider is different from the category or label assigned to the first service provider.

20. The system of claim 12, wherein the notification corresponds to creation of an FNOL (first notice of loss) submitted on behalf of the insured member.

* * * * *